US008046895B2

(12) United States Patent  
Sherrill et al.

(10) Patent No.: US 8,046,895 B2
(45) Date of Patent: Nov. 1, 2011

(54) SYSTEM AND METHOD FOR ASSEMBLING A VEHICLE BODY STRUCTURE

(75) Inventors: Cary R. Sherrill, Harrison Township, MI (US); Douglas P. Heerema, Novi, MI (US); Richard D. Pastrick, Roseville, MI (US)

(73) Assignee: Ford Motor Company, Dearborn, MI (US)

( * ) Notice: Subject to any disclaimer, the term of this patent is extended or adjusted under 35 U.S.C. 154(b) by 841 days.

(21) Appl. No.: 12/017,088

(22) Filed: Jan. 21, 2008

(65) Prior Publication Data

US 2009/0183355 A1 Jul. 23, 2009

(51) Int. Cl.
*B23Q 3/00* (2006.01)
*B23P 21/00* (2006.01)

(52) U.S. Cl. ...... 29/468; 29/281.14; 29/281.1; 29/281.5

(58) Field of Classification Search ......... 29/231.1–283, 29/428–525.15, 700–824, 897.2
See application file for complete search history.

(56) References Cited

U.S. PATENT DOCUMENTS

| | | | |
|---|---|---|---|
| 3,763,344 A | 10/1973 | Okabe et al. | |
| 4,621,516 A | 11/1986 | Schafer et al. | |
| 5,007,784 A | 4/1991 | Genov et al. | |
| 5,010,634 A * | 4/1991 | Uemura et al. | 29/407.05 |
| 5,014,901 A | 5/1991 | Moran | |
| 5,115,115 A | 5/1992 | Alborante | |
| 5,225,650 A | 7/1993 | Babel et al. | |
| 5,239,739 A | 8/1993 | Akeel et al. | |
| 5,380,978 A * | 1/1995 | Pryor | 219/121.64 |
| 5,409,158 A * | 4/1995 | Angel | 228/182 |
| 5,738,564 A | 4/1998 | Helle et al. | |
| 5,845,387 A * | 12/1998 | Bonnett et al. | 29/527.1 |
| 6,001,181 A | 12/1999 | Bullen | |
| 6,334,252 B1 | 1/2002 | Sato et al. | |
| 6,360,421 B1 | 3/2002 | Oatridge et al. | |
| 6,378,190 B2 | 4/2002 | Akeel | |
| 6,389,698 B1 | 5/2002 | Malatier | |
| 6,438,842 B1 | 8/2002 | Raami | |
| 6,467,675 B1 | 10/2002 | Ozaku et al. | |
| 6,515,251 B1 | 2/2003 | Wind | |
| 6,642,473 B2 | 11/2003 | Stiers et al. | |

(Continued)

FOREIGN PATENT DOCUMENTS

EP 0 003 024 1/1982

(Continued)

OTHER PUBLICATIONS

"High Productive and Reconfigurable Manufacturing Systems (HIPARMS)," by Hans Kurt Toenshoff and Axel Schnuelle, Institute for Production Engineering and Machine Tools (IFW), University of Hanover, publication date unknown.

(Continued)

*Primary Examiner* — Derris Banks
*Assistant Examiner* — Kaying Kue
(74) *Attorney, Agent, or Firm* — Raymond Coppiellie; Brooks Kushman P.C.

(57) ABSTRACT

A system and method for assembling a vehicle body structure. The system includes first and second end effectors for positioning first and second body structure components. The second end effector engages the first end effector to position the second body structure component relative to the first body structure component.

20 Claims, 7 Drawing Sheets

U.S. PATENT DOCUMENTS

| | | | | |
|---|---|---|---|---|
| 6,691,392 B2* | 2/2004 | Savoy et al. | ............... | 29/407.09 |
| 6,851,166 B1* | 2/2005 | Demit et al. | ................. | 29/281.5 |
| 6,931,730 B2 | 8/2005 | Elliott et al. | | |
| 2004/0167647 A1 | 8/2004 | Ghuman et al. | | |

FOREIGN PATENT DOCUMENTS

| | | |
|---|---|---|
| EP | 0 133 456 A2 | 2/1985 |
| EP | 0 203 170 | 6/1989 |
| EP | 0 166 558 | 8/1989 |
| EP | 0 044 565 | 7/1991 |
| EP | 0 446 518 A1 | 9/1991 |
| EP | 0 289 834 | 12/1992 |
| EP | 0 318 965 | 2/1995 |
| EP | 0 346 816 | 12/1995 |
| EP | 1 225 003 A2 | 7/2002 |
| EP | 1 225 121 A2 | 7/2002 |
| JP | 55155006 | 12/1980 |
| JP | 57083328 | 5/1982 |
| JP | 2220783 | 9/1990 |
| JP | 4084694 | 3/1992 |
| WO | 8607554 | 12/1986 |
| WO | 0043845 | 7/2000 |

OTHER PUBLICATIONS

"Honda Continues to Fine Tune the Art of Automobile Making," by James V. Higgins, The Detroit News, Sunday, Jul. 28, 2002.

"Cell Technology and Flexible Manufacturing Systems," Business Open Learning Archive, publication date unknown.

"Honda's Hat Trick," by Gary S. Vasilash, Editor-In-Chief, Automotive Design and Production, Oct. 2000.

"Alliance Introduces New Line of Modular Manufacturing Systems," www.allianceauto.com, Down the Line, Spring, 96 p. 1, publication date unknown.

"An American in Graz," Siemens Energy and Automation, DaimlerChrysler onsite, Totally Integrated Automation Automotive Special 2000.

"The Perils and Profits of Assembly Cells," Assembly Magazine, issue date: Jul. 2002, by John Sprovieri, posted on Jul. 16, 2002.

"Models for Specification and Control of Flexible Manufacturing Systems," Chalmers University of Technology, last modified Mar. 27, 1997.

* cited by examiner

SYSTEM AND METHOD FOR ASSEMBLING A VEHICLE BODY STRUCTURE

BACKGROUND OF THE INVENTION

Field of the Invention

The present invention relates to a system and a method for assembling a vehicle body structure.

SUMMARY OF THE INVENTION

In at least one embodiment of the present invention, a system for assembling a vehicle body structure is provided. The system includes a first manipulator having a first end effector for positioning a first body structure component and a second manipulator having a second end effector for positioning a second body structure component. The second end effector engages the first end effector to position the second body structure component relative to the first body structure component.

In at least one embodiment, a system for assembling a vehicle body structure may include a set of end effectors. The set of end effectors may include a first subset and a second subset. Each member of the first and second subsets is configured to grasp a member of a set of body structure components. Each member of the second subset engages more than one member of the first subset to position the members of the set of body structure components in an assembly position.

In at least one embodiment of the present invention, a method for assembling a vehicle body structure is provided. The method includes providing sets of end effectors and body structure components, engaging each member of the set of end effectors with a different member of a set of body structure components, positioning first and second subsets of the set of end effectors, engaging a member of the second subset to at least one member of the first subset, and performing an assembly operation to join the body structure components.

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Figure 1:
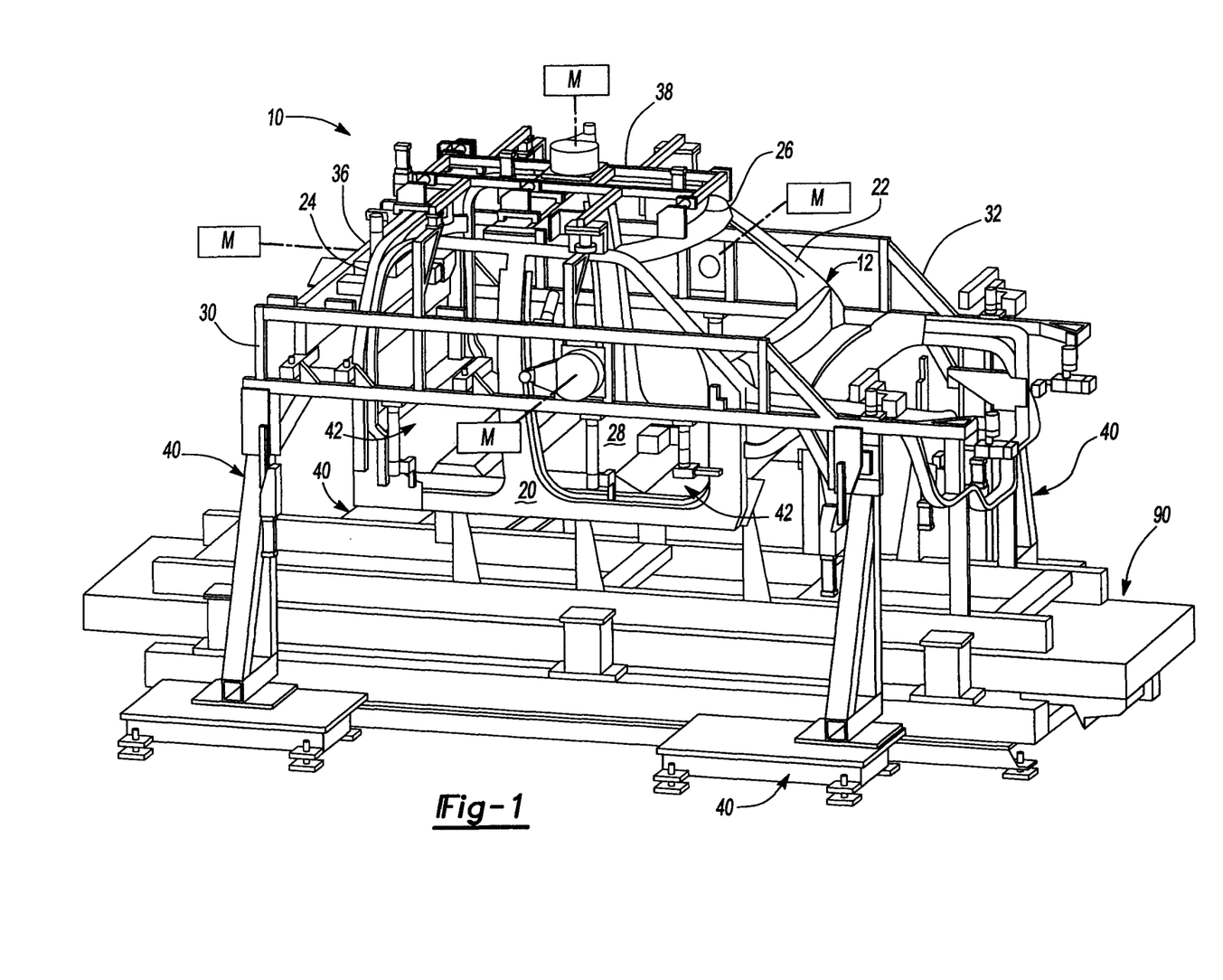
FIG. 1 is a perspective view of a system for assembling a vehicle body structure.

Referring to FIG. 1, an exemplary system 10 for assembling a vehicle body structure 12 is shown. The system 10 may be part of a vehicle body assembly line. The system 10 may be used to position and/or assemble one or more components of a vehicle body structure 12, such as may be provided with a motor vehicle like a car or truck. In FIG. 1, an exemplary vehicle body structure 12 is shown with a first side structure 20, a second side structure 22, a rear side structure 24, a top side structure 26, and a bottom side structure 28. One or more of these side structures may at least partially define a passenger compartment of a vehicle.

The system 10 may be provided in various configurations to accommodate one or more vehicle body structure designs. In addition, the system 10 may include various components, such as a set of end effectors, a set of manipulators, and optionally a set of base docking units.

The set of end effectors may include a plurality of end effectors that are each configured to engage at least one body structure component. In the embodiment shown in FIG. 1, the set of end effectors includes a first side end effector 30, a second side end effector 32, a rear side end effector 34, and a top side end effector 36. Of course, the present invention also contemplates that a different number of end effectors may be provided and that these end effectors may have similar or different configurations than those shown in FIG. 1. Moreover, the set of end effectors may be organized into first and second subsets as will be described in more detail below.

A manipulator may be associated with each end effector. For clarity, the letter M is used to represent a manipulator in FIG. 1. Each manipulator M may position an end effector along one or more axes. For example, a multi-axis robotic manipulator may be used to position an associated end effector. The manipulators M may have the same or different configurations depending on the positioning motion required. In at least one embodiment, the manipulators M may generally be standardized to reduce complexity.

The set of base docking units may engage, position, and hold a subset of the set of end effectors. As such, the base docking units may facilitate more accurate positioning of end effectors and their associated body structure components as discussed in more detail below. In the embodiment shown in FIG. 1, four base docking units 40 are shown and organized in pairs that are located on opposite sides of the assembly line. Each base docking unit 40 may be provided in a fixed position to accommodate body structures and/or end effectors having similar lengths. Alternatively, one or more base docking units 40 may be moveably positioned to accommodate a wider variety of body structures and/or end effectors.

Figure 2:
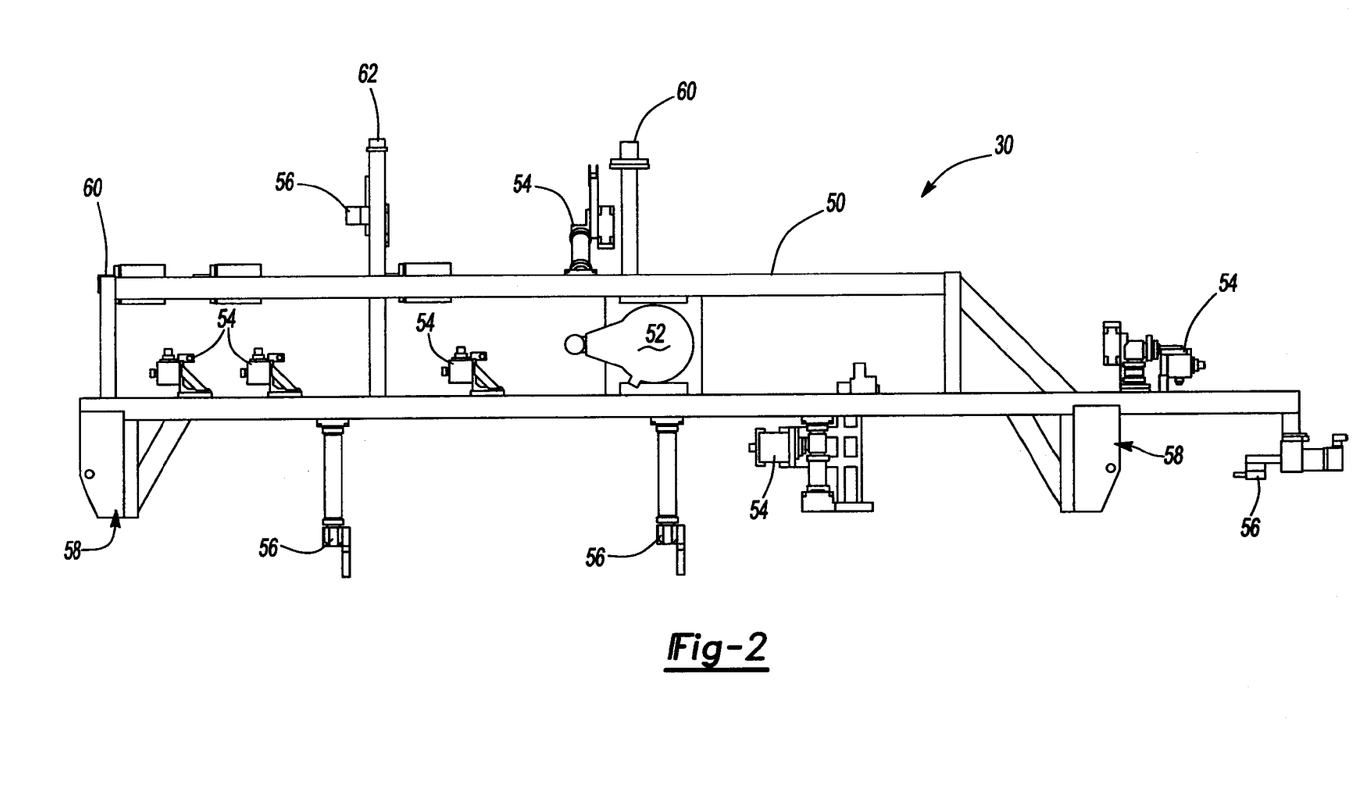
FIG. 2 is a side view of a first end effector.
Figure 3:
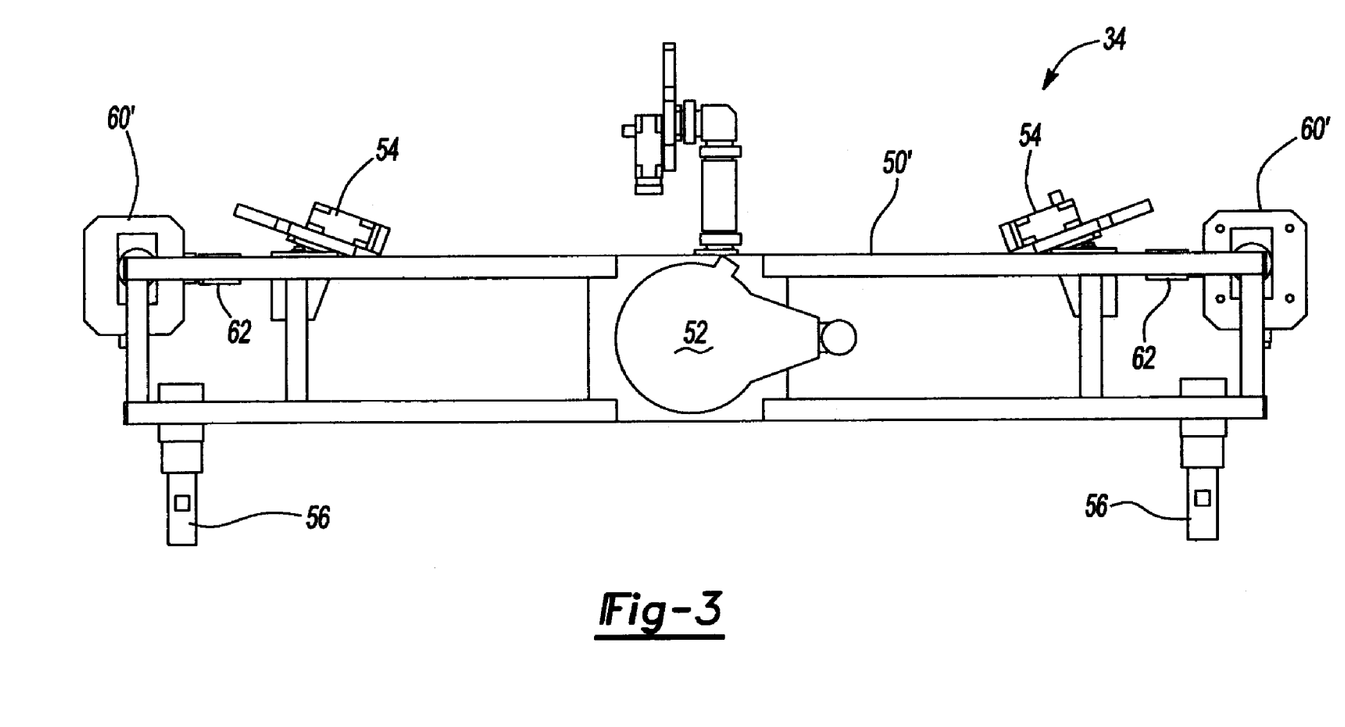
FIG. 3 is a side view of a second end effector.
Figure 4:
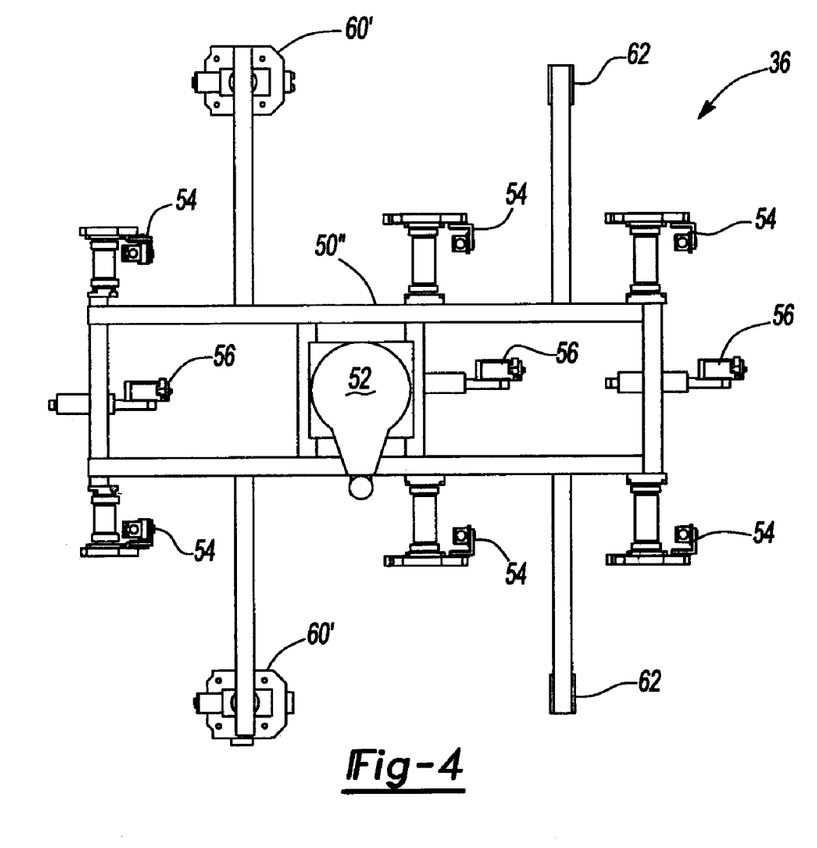
FIG. 4 is a top view of a third end effector.

Various exemplary end effectors will now be described in more detail with reference to FIGS. 2-4. FIGS. 2-4 each show an end effector from an "outside" view (i.e., from a side opposite where a body structure component would be engaged).

Referring to FIG. 2, the first side end effector 30 is shown without a body structure component. The first side end effector 30 may be configured to receive a body structure component, such as a first side structure 20 that may include at least one door opening 42 as is shown in FIG. 1. The first side end effector 30 may include a frame 50, a manipulator mount 52, one or more clamps 54, one or more locators 56, a first docking feature 58, a second docking feature 60, and one or more pads 62.

The frame 50 may have any suitable configuration and may be made of any suitable material. For example, the frame 50 may be made of metal tubing to provide a relatively stiff structure to provide stability and repeatable engagement and positioning of a body structure component.

The manipulator mount 52 may be disposed on the frame 50 and facilitate engagement with an associated manipulator M. The manipulator mount 52 may be have a quick connect configuration to allow the manipulator M to select a different end effector to accommodate different vehicle types and provide manufacturing flexibility.

The clamps 54 may be disposed on the frame 50 and may be adapted to grasp a body structure component. The clamps 54 may be of any suitable type and may be actuated in any suitable manner, such as by pneumatic or electronic devices. In addition, the clamps 54 may be situated to not interfere with assembly operations, such as positioning and operation of other manipulators and its associated tooling.

The locators 56 may be fixedly or moveably positioned with respect to the frame 50 and may have any suitable configuration. For instance, one or more locators 56 may be provided with pins or surfaces that help locate and/or support a body structure component.

The first docking feature 58 may be disposed on the frame 50 and may be adapted to engage another component, such as a base docking unit 40. In the embodiment shown in FIG. 2, a pair of first docking features 58 are provided on opposite sides of the manipulator mount 52. As such, the first docking features 58 may be positioned to help reduce moments about the manipulator mount 52.

The first docking feature 58 may have any suitable configuration, such as a male or female configuration that is compatible with an associated docking feature on the base docking unit 40. For example, the first docking feature 58 may have a female or socket configuration that receives a compatible docking feature on the base docking unit 40 as will be discussed in more detail below.

The second docking feature 60 may be disposed on the frame 50 and may be adapted to engage another end effector. In the embodiment shown in FIG. 2, a pair of second docking features 60 are provided for engagement with different end effectors, such as the rear and top side end effectors 34, 36. The second docking feature 60 may have a different configuration than the first docking feature 58 as will be discussed in more detail below.

One or more pads 62 may be disposed on the frame 50 and may be adapted to contact another end effector. In the embodiment shown in FIG. 2, a pad 62 is provided for engagement with another end effector, such as the rear or top side end effector 36. A pad 62 may have any suitable configuration, such as a planar or nonplanar configuration.

The second side end effector 32 may have a similar configuration as the first side end effector 30. For example, the second side end effector 32 may generally be configured as a mirror image of the first side end effector 30 as is shown in FIG. 1. The second side end effector 32 may be configured to receive a body structure component, such as a second side structure 22 that may include one or more door openings.

Referring to FIG. 3, an exemplary rear side end effector 34 is shown. The rear side end effector 34 may be configured to receive a body structure component, such as a rear side structure 24. The rear side end effector 34 may include similar features as other end effectors, such as a frame 50', a manipulator mount 52, one or more clamps 54, one or more locators 56, a second docking feature 60', and one or more pads 62. The frame 50' and second docking feature 60' may have a different configuration than that associated with the first and second side end effectors 30, 32 as will be discussed in more detail below.

Referring to FIG. 4, an exemplary top side end effector 36 is shown. The top side end effector 36 may be configured to receive at least one body structure component, such as a top side structure 26 that may at least partially define a roof or roof support portion of a vehicle. The top side end effector 36 may include similar features as other end effectors, such as a frame 50", a manipulator mount 52, one or more clamps 54, one or more locators 56, a second docking feature 60', and one or more pads 62.

As previously mentioned, the set of end effectors may be organized into first and second subsets. Each subset has at least one member. For example, the first subset may include the first and second side end effectors 30, 32 while the second subset may include the rear and top side end effectors 34, 36. Of course, the present invention contemplates that the set of end effectors may include a different number of end effectors and that the end effectors may be organized in subsets in any suitable manner.

Figure 5A:
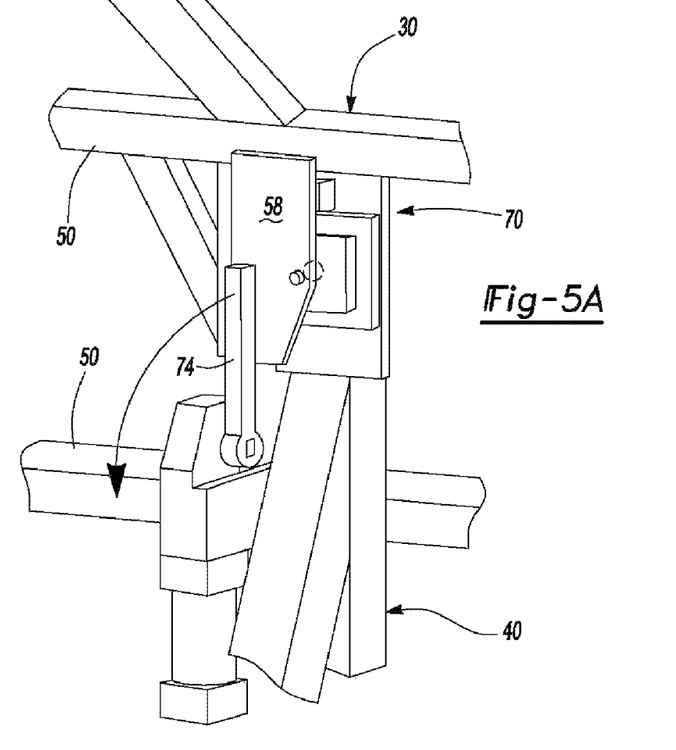
FIGS. 5A and 5B are perspective views of a first docking interface.
Figure 5B:
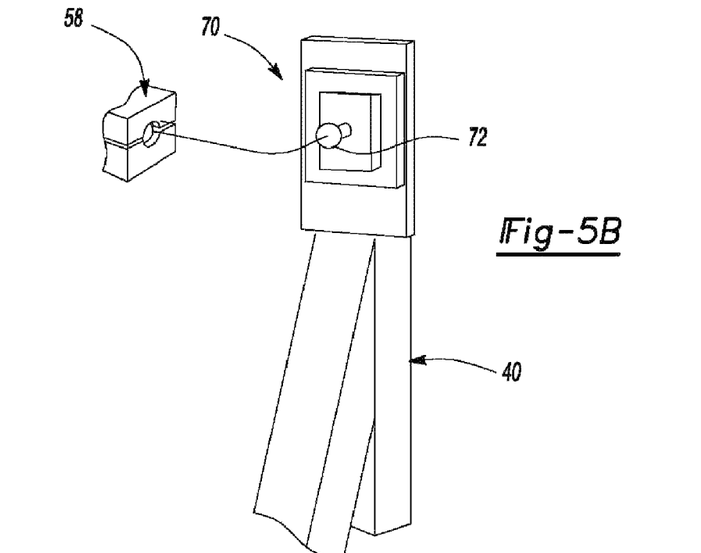

The members of the first subset may be configured to engage or interlock with a base docking unit 40 using a first type of docking interface 70. An example of a first type of docking interface 70 is shown in FIGS. 5A and 5B. For example, the base docking unit 40 may include a base docking feature 72 that engages a first docking feature 58 on the first or second side end effectors 30, 32. The first docking feature 58 and base docking feature 72 may have any compatible configuration, such as a male configuration, female configuration, or combinations thereof. In the embodiment shown, the base docking feature 72 has a male configuration that is generally ball shaped while the first docking feature 58 has a generally spherical socket that receives the base docking feature 72. The base docking unit 40 may also include an arm 74 that may be actuated between an open position and a closed position. In the closed position such as is shown in FIG. 5A, the arm 74 may contact the end effector near the first docking feature 58 to help hold the first type of docking interface 70 together. In the open position such as is shown in FIG. 5B, the first type of docking interface 70 may be disengaged.

Figure 6A:
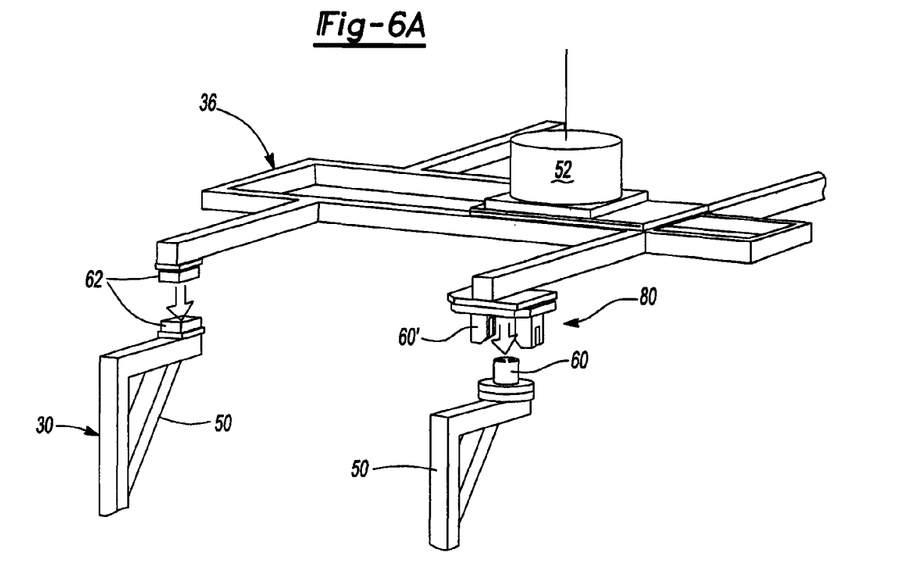
FIGS. 6A and 6B are perspective views of a second docking interface.
Figure 6B:
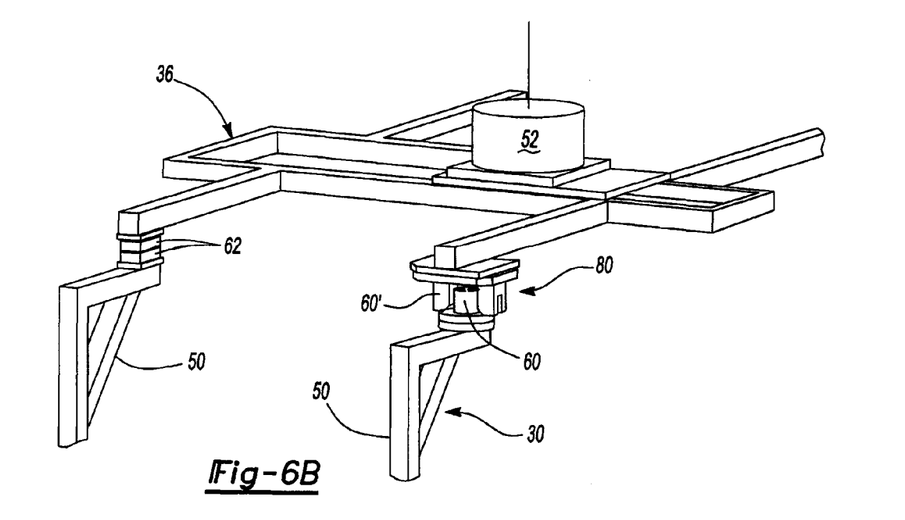

In addition, the members of the first subset may be configured to engage or interlock with a member of the second subset with a second type of docking interface 80. The second type of docking interface 80 may have a different configuration than the first type of docking interface 70 to simplify end effector to end effector engagement. An example of a second type of docking interface 80 is shown in FIGS. 6A and 6B. For example, an end effector such as the first and/or second side end effectors 30, 32 may include a second docking feature 60 while the rear and/or top side end effectors 34, 36 may include a docking feature 60'. In the embodiment shown, the second docking feature 60 has a male configuration that is generally cylindrical while the second docking feature 60' has an open sided female socket that receives the second docking feature 60. The second type of docking feature 80 may allow at least one end effector to move linearly between a disengaged position as shown in FIG. 6A and an engaged position as shown in FIG. 6B without clamping end effectors to each other.

Figure 7:
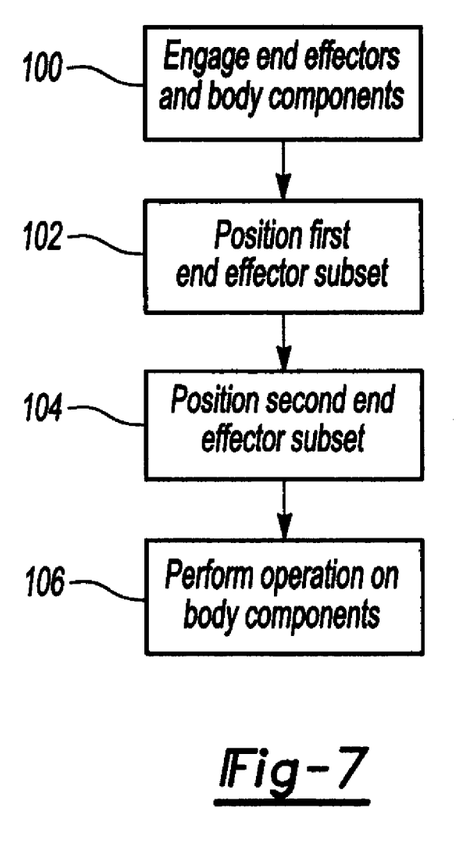
FIG. 7 is a flowchart of a method for assembling a vehicle body structure with the system of the present invention.

Referring to FIG. 7, a method for assembling a vehicle body structure with the system of the present invention is shown. Initially, the method presumes that the appropriate end effectors are engaged with their associated manipulators and that each end effector is unloaded (i.e., each end effector is not engaging a body structure component).

At block 100, the method begins by engaging end effectors with a compatible body structure component. For example, each manipulator may position an associated end effector adjacent to a body structure component. Then the clamps on each end effector are actuated to a closed position to grasp and secure a body structure component to and associated end effector.

At block 102, one or more manipulators associated with a first subset of the set of end effectors may move an associated end effector to a desired location. For example, the manipulators associated with the first and second side end effectors 30, 32 may move to engage base docking units 40 via docking interface 70. As such, the body structure components associated with these end effectors are positioned in a desired location.

At block 104, one or more manipulators associated with a second subset of the set of end effectors may move an associated end effector into engagement with one or more members of the first subset. For example, the manipulators associated with the rear and top side end effectors 34, 36 may each be moved to engage the first and second side end effectors 30, 32 via docking interface 80. Upon completion of this step, the end effectors and their associated body structure components will be positioned in a desired location for subsequent assembly operations. The members of the second subset may not engage each other to simplify positioning and tolerance stackups and to avoid locking the end effectors in a configuration that would be difficult to disengage.

At block 106, one or more operations may be performed on the body structure components. For example, one or more assembly operations may be performed to join each body structure component to at least one other body structure component. These assembly operations may include but are not limited to spot welding, fastener engagement, and/or adhesive application. In addition, other assembly operations not associated with joining body structure components to each other may be performed. For example, other components or subassemblies may be installed or coating operations may be performed.

After an operation is completed, the clamps on each end effector may be actuated to release the end effectors from the body structure components. The released body structure may then be moved to another station in any suitable manner, such as by using a material handling system like a palletized conveyor 90 as shown in FIG. 1. The method steps may then be repeated to assembly additional vehicle body structures.

While the best mode for carrying out the invention has been described in detail, those familiar with the art to which this invention relates will recognize various alternative designs and embodiments for practicing the invention as defined by the following claims.

What is claimed:

1. A system for assembling a vehicle body structure, the system comprising:
   a first manipulator having a first end effector for positioning a first body structure component; and
   a second manipulator having a second end effector for positioning a second body structure component;
   wherein the second end effector engages the first end effector to position the second body structure component relative to the first body structure component; and
   wherein the first end effector is fixedly positioned on a member of a set of stationary base docking units, the second end effector does not engage any member of the set of stationary base docking units, and each member of the set of stationary base docking units has an arm that is rotated to secure the first end effector.

2. The system of claim 1 wherein the first and second end effectors each include a plurality of clamps for grasping the first and second body structure components, respectively.

3. The system of claim 1 wherein engagement of the second end effector to the first end effector locates the second body end effector and second body structure component in a stationary position along three perpendicular axes.

4. The system of claim 1 further comprising a base docking unit having a base docking feature that receives a docking feature disposed on the first end effector to position the first end effector.

5. The system of claim 1 wherein the first body structure component is a body side subassembly and the second body structure component is a rear side frame subassembly.

6. A system for assembling a vehicle body structure, the system comprising:
   a set of stationary base docking units that include a rotatable arm; and
   a set of end effectors, including:
      a first subset of the set of end effectors, each member of the first subset being configured to grasp a different member of a set of body structure components and
      a second subset of the set of end effectors, each member of the second subset being configured to grasp a different member of the set of body structure components;
   wherein each member of the second subset engages more than one member of the first subset to position the members of the set of body structure components in an assembly position;
   wherein each member of the first subset is fixedly positioned with respect to a member of the set of base docking units when each member of the first subset engages a member of the set of base docking units; and
   wherein the rotatable arm on each member of the set of stationary base docking units is rotated to engage a member of the first subset of the set of end effectors.

7. The system of claim 6 further comprising a set of robotic manipulators, wherein each member of the set of robotic manipulators engages and is configured to position a different member of the set of end effectors.

8. The system of claim 6 wherein no member of the second subset engages another member of the second subset.

9. The system of claim 6 further comprising a set of base docking units positioned on a floor and spaced apart from each other, wherein each member of the first subset interlocks with a member of the set of base docking units before the members of the second subset engage a member of the first subset.

10. The system of claim 9 further comprising a first docking interface that engages members of the first subset to members of the set of base docking units and a second docking interface that differs from the first docking interface and engages members of the first and second subsets to each other.

11. A method for assembling a vehicle body structure, the method comprising:
   providing a set of end effectors;
   providing a set of body structure components;
   providing a set of base docking units that are stationary;
   engaging each member of the set of end effectors with a different member of a set of body structure components;
   positioning a first subset of the set of end effectors into engagement with a member of the set of base docking units;
   rotating an arm on each member of the set of base docking units to engage a member of the first subset;
   positioning a second subset of the set of end effectors after positioning the first subset;
   engaging a member of the second subset to at least one member of the first subset; and
   performing an assembly operation to join the body structure components.

12. The method of claim 11 wherein at least one member of the second subset engages more than one member of the first subset.

13. The method of claim 11 wherein each member of the first subset engages each member of the second subset in a different location.

14. The method of claim 11 wherein no member of the second subset engages another member of the second subset.

15. The method of claim 11 wherein the members of the first subset are positioned opposite each other.

16. The method of claim 11 wherein the first subset includes left and right side end effectors that receive left and right side vehicle body structures, respectively.

17. The method of claim 11 wherein the second subset includes top and rear side end effectors that receive top and rear side vehicle body structures, respectively.

18. The method of claim 11 wherein the arm includes a docking feature that is received in a corresponding docking feature disposed on a member of the first subset.

19. The method of claim 11 each member of the first subset of the set of end effectors include first and second types of docking interfaces that differ from each other for engaging members of the set of base docking units and the second subset of end effectors, respectively.

20. The method of claim 11 wherein each member of the set of end effectors is disposed on a different robotic manipulator.

* * * * *